United States Patent [19]

Woodrow et al.

[11] Patent Number: 4,878,795
[45] Date of Patent: Nov. 7, 1989

[54] BUSH HAVING A RADIALLY ENLARGED FLANGE

[75] Inventors: Michael Woodrow, Welwyn Garden City; Raymond D. Lacey, Essendon, both of England

[73] Assignee: Avdel Systems Limited, Welwyn Garden City, England

[21] Appl. No.: 267,300

[22] Filed: Nov. 4, 1988

[30] Foreign Application Priority Data

Nov. 11, 1987 [GB] United Kingdom ............... 8726363

[51] Int. Cl.$^4$ .................... F16B 19/08; F16B 37/04
[52] U.S. Cl. .................................. 411/501; 411/183; 411/353
[58] Field of Search ............... 411/500, 501, 352, 353, 411/180, 181, 183, 546; 52/787

[56] References Cited

U.S. PATENT DOCUMENTS

| 2,255,964 | 9/1941 | Blaho | 411/183 |
| 3,393,724 | 7/1968 | Joffe | 411/180 |
| 3,765,465 | 10/1973 | Gulistan | 411/353 |
| 4,232,496 | 11/1980 | Warkentin | 52/787 |
| 4,557,100 | 12/1985 | Gorges | 411/501 |
| 4,747,738 | 5/1988 | Duran | 411/353 |

Primary Examiner—Neill R. Wilson
Attorney, Agent, or Firm—Oblon, Spivak, McClelland, Maier & Neustadt

[57] ABSTRACT

A bush for installation in easily crushed or marred work material such as apertured honeycomb sheet or fibre reinforced plastics material, enables the work material to be secured to a support, by means of a nut and bolt, without damage. The bush has a cylindrical body longer than the thickness of the work, and a flange for abutting a face of the work at one end of the body. The other end of the body has an annular boss which projects beyond the other face of the work, and, peripherally of the boss an annular skirt which during installation can be deformed to provide a retaining flange for engaging the other face of the work. A bolt can then be passed through the bush and a support, and secured with a nut. Only the bush directly engages the work.

7 Claims, 3 Drawing Sheets

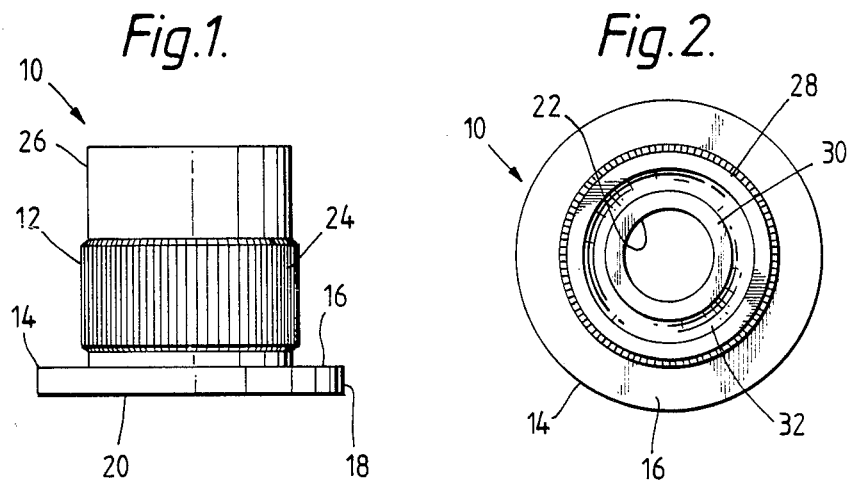
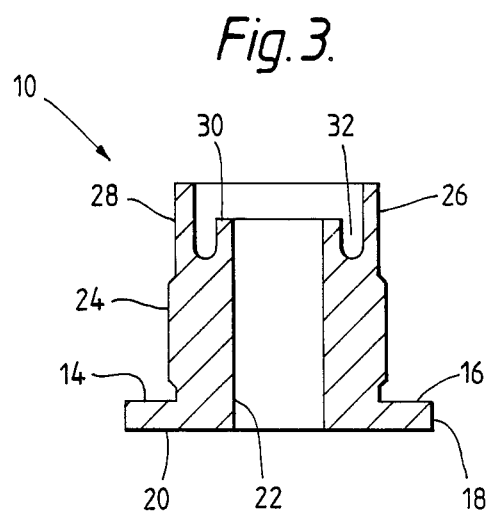

BUSH HAVING A RADIALLY ENLARGED FLANGE

BACKGROUND OF THE INVENTION

1. Field of the Invention

This invention relates to bushes, and more particularly to a bush for installation in apertured work of easily marred or crushed material to receive a bolt or similar headed fastening device, and whereby the bolt can be prevented from damaging the work.

2. Background of the Related Art

Honeycomb structural materials and composite materials such as plastics material having reinforcement fibers of carbon or glass, particularly in the form of sheets, are used extensively where their light-weight properties and high-tensile strength are advantageous. However, such materials are easily marred or crushed, or otherwise subjected to physical damage, resulting in significant impairment of their desirable properties. Such damage can occur when work made of such materials is assembled and fastened together using fasteners, such as bolts or the like, having a head of small bearing area which bears on a surface of the material adjacent to a hole through which a shank of the fastener passes. Thus, the head of the fastener may crush the material, or may abrade, tear, or otherwise mar the surface of the material, to the considerable detriment of its properties. Furthermore, the shank of the fastener, having a small bearing area, may also damage the material around the hole unless the hole is sleeved or bushed in order to reinforce the material or increase its bearing area.

We have now devised a bush for installation in an aperture in work which may be easily marred or crushed, and which will afford protection to the work against damage by a bolt used to fasten the work to another structure.

SUMMARY OF THE INVENTION

According to the invention, there is provided a bush having a generally cylindrical body and a radially enlarged flange at one end of the body for abutting one face of a workpiece, and an axial bore throughout the body and flange, the end of the body remote from the flange having an annular boss peripherally of the bore. A deformable annular skirt extends from the remote end of the body peripherally of the boss.

The annular skirt may be spaced radially from the annular boss.

The annular skirt may extend beyond the boss in the direction axially and away from the flange.

The peripheral surface of the body may be splined in a region intermediate between the flange and the skirt.

The splined region may be spaced axially from the flange and/or the skirt.

BRIEF DESCRIPTION OF THE DRAWINGS

Preferred forms of the invention will now be described, by way of example, with reference to the accompanying drawings, in which FIG. 1 is a side elevation of a bush according to the invention;

FIG. 2 is a plan view of the bush of FIG. 1;

FIG. 3 is a longitudinal sectional elevation of the bush of FIG. 1;

DETAILED DESCRIPTION OF THE PREFERRED EMBODIMENTS

Figure 4:
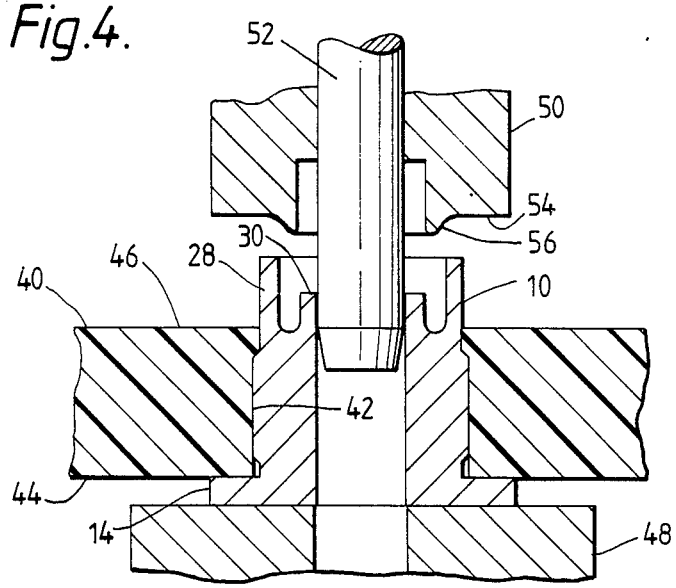
FIGS. 4, 5 and 6 are sectional elevations of a bush, a workpiece in which the bush is to be installed, and tooling for installing the bush, and showing, respectively, initial, immediate, and final stages in the installation of the bush.

Referring first to FIG. 1 of the drawings, a bush 10 comprises a generally cylindrical body 12, and a radially enlarged flange 14 at one end of the body. The flange 14 presents a smooth planar radial surface 16 facing towards the body, a circular peripheral surface 18, and a flat bearing surface 20 at the end of the bush remote from the body.

The flange 14 has a diameter substantially greater than that of the body, so as to present a relatively large bearing area, and has a substantial thickness so as to be robust.

A through bore 22 of constant diameter extends axially through the flange and body of the bush.

The body 12 has a splined region 24 at an intermediate position between its ends, in which the external surface of the body is provided with splines which extend in the axial direction, and rise slightly above the level of the surface of the body outside the splined region. The splines may be formed by impressing longitudinal grooves into the external surface of the body so as to displace material to form the individual splines between pairs of adjacent grooves.

Beyond the splined region 24 in the direction away from the flange, the body has a tail portion 26 extends from an end of the body remote from the flange 14 so that the body defines an intermediate portion between the flange 14 and the tail portion.

The tail portion 26 is constituted by two annular parts which are concentric with the bore 22 and with each other. These parts are a radially outer skirt 28 and a radially inner boss 30, and are separated radially from each other by an annular gap 32.

Figure 6:
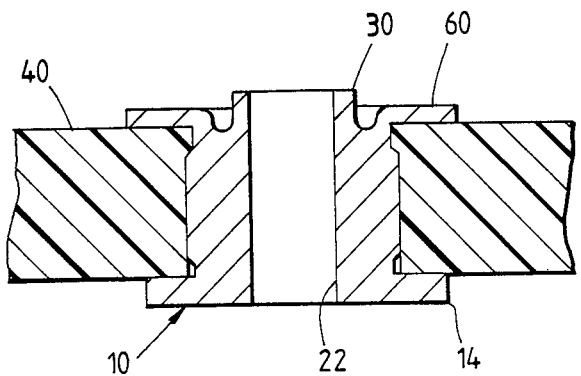

The length of the boss 30, in the axial direction of the bush, is greater than the thickness of the skirt 28 (see FIG. 6) and is made sufficient to accommodate some variation in thickness of the work in which it is intended to install the bush, and is made equal to, or very slightly greater than, the difference between the intended maximum and minimum thicknesses of the work.

The length of the skirt 28, in the axial direction, is greater than that of the boss 30 so that the skirt 28 extends beyond the end of the boss 30 in the direction away from the flange 14. The radial thickness of the boss is approximately half the radial thickness of the body in the region between the tail portion 26 and the flange 14. The radially inner surface of the boss forms part of the wall of the bore 22.

The skirt 28 peripherally surrounding the boss is spaced radially from the boss, to form the gap 32, by a distance which is equal to less than a quarter of the radial thickness of the body outside the tail portion. Thus, he skirt has a radial thickness less than that of the boss, and is, therefore, relatively thin and more easily deformable than the boss.

The skirt is intended to be permanently deformed, by means of a suitable tool during installation, so as to flare outwardly to form a retaining flange.

In this embodiment, the bush is made of mild carbon steel.

The installation and use of a bush according to the invention will now be described with reference, by way of example, to the installation of the bush 10 in a workpiece in the form of a sheet of carbon fiber reinforced plastics material, and the fastening of the sheet to a support member.

Referring first to FIG. 4, the bush 10 is installed in a sheet 40 of carbon fiber reinforced plastics material of appropriate thickness and having a through aperture 42 by first inserting the body 12 of the bush through the aperture 42 so that the planar surface 16 of the flange 14 abuts a face 44 of the sheet and the tail portion 26 projects beyond the opposite face 46 of the sheet, and then deforming the skirt 28 so as to abut the face 46, using suitable tooling.

The diameter of the aperture 42 and the diameter of the body are related in such a way that, on insertion of the body, the splines embed slightly in the material of the sheet peripherally of the aperture.

The axial length of the portion of the body between the flange 14 and the tail portion 26 is made not greater than, but preferable closely similar to the thickness of the sheet 40, so that the tail portion of the inserted bush lies within the sheet and projects substantially beyond the face 46.

The tooling used in this example includes a support dolly 48, and an annular anvil 50 which, together with a guide pin 52, is mounted in a suitable press (not shown) for movement towards and away from the dolly.

The dolly 48, which in this example is apertured, is then positioned in contact with the bearing surface 20 of the flange 14 and with its aperture in register with the bore 22 of the bush, so as to support the bush against a force applied to the tail-portion and directed axially towards the flange.

The annular anvil 50, for deforming the skirt 28, has an annular flat face 54 peripherally of an annular lip 56 which projects forwardly of and tapers away from the face 54. The guide pin 52 is located in the aperture of the anvil, projecting forwardly of the face 54 and the lip 56, and has a diameter such as to be a clearance or sliding fit in the bore 22 of the bush.

The internal diameter of the lip 56 is slightly greater than the external diameter of the boss 30, and its narrow forward extremity is of such a thickness as to be able to enter the gap between the boss and the skirt 28.

Figure 5:
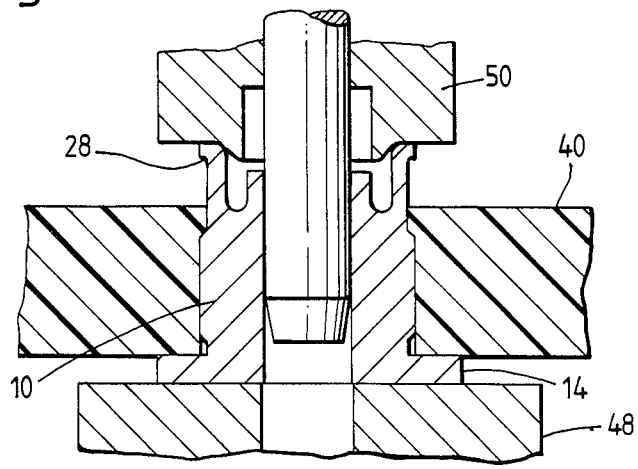

The press is then operated to move the pin and anvil towards the dolly. The pin enters the bore 22, centring the anvil and bush relative to each other as shown in FIG. 4, and then the lip 56 engages the inner surface of the skirt and, as the anvil moves forwardly, progressively deforms the skirt as shown in FIG. 5, causing the skirt to become outwardly flared so that it encounters the flat face 54 and is thereby flattened and pressed into contact with the face 46 of the sheet to constitute a retaining flange 60 (shown in FIG. 6) which opposes the flange 14.

The boss 30 is not deformed by the anvil and remains upstanding above the retaining flange 60 and the face 46 of the sheet.

Thus, the bush 10 is installed in the sheet and retained therein by the flanges 14 and 60 which abut the two opposing faces of the sheet.

Operation of the press during installation of the bush is controlled carefully so as to avoid damaging the sheet by compression between the flanges 14 and 60.

The sheet can then be fastened to a support member by means of a conventional fastener, such as a bolt.

Figure 7:
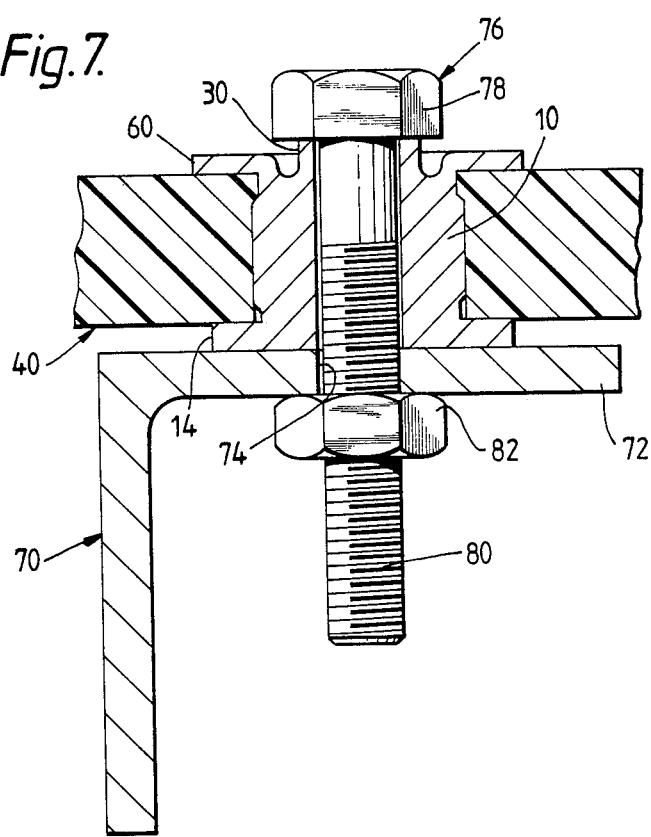
FIG. 7 is a sectional view illustrating the use of the bush in the mounting of a sheet on a support.

Thus, in one example, shown in FIG. 7, the support member is in the form of an angle bar 70 having a flange 72 formed with an aperture 74. The sheet, with the installed bush 10, is offered to the flange 72 so that the bearing surface 20 of the flange 14 of the bush abuts the flange 72, and the bore of the bush registers with the aperture 74. A bolt 76 having a head 78 and a threaded shank 80 is then inserted through the bore and the aperture 74, so that the head 78 abuts the projecting boss 30, and part of the shank projects beyond the flange 72 of the support. A nut 82 is then engaged with the projecting part of the shank and rotated to draw the head of the bolt towards the flange 72.

Thus, the bush can be tightly clamped between the bolt head and the supporting flange 72 so that the sheet is firmly attached to the support, but the tightened bolt does not engage the sheet itself and causes no damage to the sheet. More particularly, the boss spaces the head of the bolt from the face 46 of the sheet by a distance corresponding to the distance through which the boss 30 projects beyond the face 46 of the sheet.

We claim:

1. A bush comprising:
   a generally cylindrical body;
   a radially enlarged flange extending from adjacent one axial end of said body for abutting one face of a workpiece;
   an axial bore extending through said cylindrical body and said flange; and
   a tail portion extending axially from an end of said body opposite said flange whereby said body defines an intermediate portion between said flange and said tail portion, wherein said tail portion comprises:
   (a) an annular boss extending axially from said opposite end of said body, said axial bore extending through said annular boss so that said annular boss surrounds said axial bore, and
   (b) a deformable annular skirt extending axially from said opposite end of said body by a distance greater than the axial length of said boss, said skirt surrounding said annular boss with an annular gap therebetween,
   wherein the axial length of said boss is greater than the radial thickness of said skirt, whereby said annular skirt may be deformed to extend radially of said intermediate portion and form a second radially enlarged flange at said opposite end of said body when said intermediate portion is inserted through the workpiece and said annular boss extends axially beyond said deformed annular skirt.

2. A bush as claimed in claim 1, wherein the peripheral surface of said intermediate portion is splined.

3. A bush as claimed in claim 2, wherein said splines are spaced axially from at least one of the flange and the skirt.

4. A bush as claimed in claim 1 wherein said radially enlarged flange extending from adjacent one axial end of said body presents a smooth, planar radial surface facing said tail portion of said body.

5. A bush as claimed in claim 4, wherein said intermediate portion has an axial length such that said intermediate portion can extend substantially through the workpiece.

6. A bush as claimed in claim 5 installed in the workpiece, wherein said deformable annular skirt is deformed to form the second radially enlarged flange and said workpiece is held between said radially enlarged flange and said second radially enlarged flange.

7. A bush as claimed in claim 6 in combination with a bolt passing through said axial bore, said bolt having a head abutting only said boss whereby compressive stresses from said bolt are not applied to said workpiece.

* * * * *